(12) United States Patent
Nabeiro et al.

(10) Patent No.: US 12,740,662 B2
(45) Date of Patent: Sep. 22, 2026

(54) BEVERAGE PREPARATION SYSTEMS WITH ENHANCED DISPOSITION OF MOTORIZED ACTUATION

(71) Applicant: NOVADELTA—COMÉRCIO E INDÚSTRIA DE CAFÉS, LDA, Lisbon (PT)

(72) Inventors: Rui Miguel Nabeiro, Campo Maior (PT); Jesús Medina Mundt, Lisbon (PT); João André De Brito Leão, Vila Nova de Gaia (PT)

(73) Assignee: NOVADELTA—COMÉRCIO E INDÚSTRIA DE CAFÉS, LDA, Lisbon (PT)

( * ) Notice: Subject to any disclaimer, the term of this patent is extended or adjusted under 35 U.S.C. 154(b) by 1169 days.

(21) Appl. No.: 17/776,341

(22) PCT Filed: Nov. 10, 2020

(86) PCT No.: PCT/PT2020/050044
§ 371 (c)(1),
(2) Date: May 12, 2022

(87) PCT Pub. No.: WO2021/096377
PCT Pub. Date: May 20, 2021

(65) Prior Publication Data

US 2022/0395131 A1 Dec. 15, 2022

(30) Foreign Application Priority Data

Nov. 15, 2019 (PT) ........................................ 115913

(51) Int. Cl.
*A47J 31/36* (2006.01)
*A47J 31/44* (2006.01)
*A47J 31/52* (2006.01)

(52) U.S. Cl.
CPC ....... *A47J 31/3633* (2013.01); *A47J 31/4403* (2013.01); *A47J 31/525* (2018.08)

(58) Field of Classification Search
CPC ... A47J 31/4403; A47J 31/525; A47J 31/3633
See application file for complete search history.

(56) References Cited

U.S. PATENT DOCUMENTS

2010/0098823 A1 4/2010 Nenov et al.
2013/0152797 A1 6/2013 Mori
(Continued)

FOREIGN PATENT DOCUMENTS

CN 201452867 U 5/2010
EP 2177393 B1 11/2015
(Continued)

OTHER PUBLICATIONS

International Search Report of PCT/PT2020/050044 dated Feb. 8, 2021 [PCT/ISA/210].

(Continued)

*Primary Examiner* — Elizabeth M Kerr
*Assistant Examiner* — Kuangyue Chen
(74) *Attorney, Agent, or Firm* — Sughrue Mion, PLLC

(57) ABSTRACT

Beverage preparation systems, in particular espresso coffee and similar aromatic beverages, based upon a beverage preparation apparatus that has a beverage preparation device adapted so that can be actuated between open and closed positions by an actuation disposition that includes an electric motor whose operation can be regulated by a control mechanism, and thereby collect an individual portion of beverage ingredients, whereby the actuation disposition is arranged in advantageous position inside the apparatus and presents enhanced configuration and smaller construction volume.

20 Claims, 9 Drawing Sheets

(56) References Cited

U.S. PATENT DOCUMENTS

2013/0276638 A1 10/2013 Kristlbauer
2017/0007066 A1* 1/2017 Bonacci .............. A47J 31/3633
2021/0315411 A1* 10/2021 Burrows ................. A47J 31/00

FOREIGN PATENT DOCUMENTS

WO 2008/129033 A1 10/2008
WO 2012/025258 A1 3/2012
WO 2012/025259 A1 3/2012
WO 2012/072764 A1 6/2012

OTHER PUBLICATIONS

Written Opinion of PCT/PT2020/050044 dated Feb. 8, 2021 [PCT/ISA/237].

* cited by examiner

BEVERAGE PREPARATION SYSTEMS WITH ENHANCED DISPOSITION OF MOTORIZED ACTUATION

CROSS REFERENCE TO RELATED APPLICATIONS

This application is a National Stage of International Application No. PCT/PT2020/050044 filed on Nov. 10, 2020, claiming priority based on Portuguese Patent Application No. 115913 filed on Nov. 15, 2019.

FIELD OF THE INVENTION

The present invention refers to the field of the systems and processes of beverage preparation based upon an individual portion of beverage ingredients, and in particular whereby the actuation of a beverage preparation device is driven by an electric motor.

BACKGROUND OF THE INVENTION

The prior art presents several solutions of beverage preparation apparatus, such as for example coffee machines, whereby the extraction device is adapted so that can collect an individual portion of edible substance, for example roasted and ground coffee beans, and can be actuated by an electric motor between open and closed positions.

The document US 2010/0098823 A1 discloses a portable espresso coffee machine de café that includes an extraction device operated by a piston that is actuated by an electric motor with a power of less than 100 W.

The document EP 2177393 B1 also discloses a coffee machine with an extraction device actuated by a low energy consumption motor. The electric motor can be a direct current and low voltage motor, for example stabilized 24 V. The electric motor is provided in operative connection with a control unit so that the latter can activate and deactivate the electric motor. It is further foreseen a current sensor operatively connected to the control unit and based upon which the latter can determine the electric current absorbed by the electric motor in several stages of opening and closing of the infusion chamber. This document further discloses several graphics of energy use representative of the operation of the electric motor for actuation of the extraction device, in particular evolution of the current intensity in time, between respective initial and final positions in the movement paths. Said graphics disclose maximum consumptions below 50 W of electrical power, in particular below 25 W. moreover, said graphics of energy use disclose consumption evolution patterns whereby a first actuation phase of the electric motor consumes a fraction of the current used in a second phase next to the destination position. The document is silent in what regards an active control of the power consumed along most part of the movement path generated by the electric motor, including in the region of movement path in the proximity of the destiny position, but not in the region of movement path adjacent to the destiny position.

The document WO 2012/025259 A1 also discloses an extraction device actuated by electric motor, in this case a low consumption motor that requires an electric power of no more than 50 W and/or generates a torque of no more than 50 mN·m to move the extraction device between open and closed positions.

The document WO 2012/025258 A1 discloses a control method of motor that includes the measurement of at least one electric parameter representative of the power consumed by the motor, and the comparison of the evolution of this representative parameter in time with a previously defined reference.

The document CN 201452867 U discloses a coffee machine for coffee capsules that presents an extraction device by electric motor. In particular, the electric motor is disposed so that extends along a direction generally parallel to the direction of the driving came and, therefore, to the movement of the extraction device, and along a generally longitudinal direction of the machine. The transmission of movement of the electric motor to the driving came is provided by a gear set, whereby each one of the three movement components is supported by a common support structure.

The document WO 2012/072764 A1 seems to present a similar disposition of the three components, that is, electric motor, transmission gear set and driving came, both in terms of relative disposition to each other, as well as in terms of relative disposition inside of the machine. Moreover, the electric motor and a plurality of elements of movement transmission are each one directly fixated to a single element of common mechanic support.

The document WO 2008/129033 A1 also seems to disclose an extraction unit of a coffee machine whereby the electric motor and elements of transmission of movement are fixated to a common support element. Moreover, also in this case the electric motor is disposed so that a bigger extension thereof extends along a direction parallel to the direction of movement of a mobile part of the extraction device.

None of the documents in the prior art thus discloses a solution that provides an apparatus with a beverage preparation device actuated by electric motor in conditions of adjustment to effective torque requirements, and, therefore, of electric power, as well as presenting actuation monitoring means adapted so as to provide regulation of the electric motor based upon movement parameters along the movement path, and further with a more advantageous disposition of transmission of movement between the electric motor and a driving came operatively associated with at least part of said beverage preparation device, both in terms of transmission efficiency as well as in terms of construction simplicity and reduction of the volume required by the actuation disposition inside of a beverage preparation apparatus.

General Description of the Invention

The objective of the present invention is to provide a beverage preparation apparatus including a beverage preparation device, for example an extraction device, adapted so that can collect an individual portion of edible substance, for example a portion of roasted and ground coffee beans, and further including an actuation disposition adapted so that can open and close said beverage preparation device, and presenting better operation efficiency and configuration, as well as more compact construction and better arranged inside the apparatus.

At least one mobile part of the beverage preparation device can be actuated by the actuation disposition in linear movement along a movement path between an initial position and a destiny position, said positions corresponding alternatingly to open condition, whereby the beverage preparation device can collect an individual portion of edible substance, and closed condition, whereby said individual portion is confined inside thereof.

In particular, the objective of the present invention is to provide an apparatus including an actuation disposition of beverage preparation device that, considering the relative disposition of beverage discharge and drinking recipient, can occupy less constructive space inside the apparatus, while simultaneously providing a more efficient transmission of movement from the electric do motor to the beverage preparation device.

This objective is attained according to the present invention by means of a beverage preparation apparatus according to claim 1.

In particular, this objective is solved according to the present invention by means of an actuation disposition whereby the electric motor and the gear box extend in an alignment parallel to the direction of the gravity force, and the driving exit of the gear box is provided laterally, in orthogonal manner relative to said alignment and directly operatively connected to a driving came that actuates at least one of the parts of beverage preparation device along a movement path.

The actuation disposition can include a single gear set provided in a single relative position with relation to the electric motor and to the driving came that drives a mobile part of the beverage preparation device.

The single gear set can present a movement entry oriented in a first direction and directly operatively connected to a movement exit of the electric motor, and presents a movement exit oriented in a second direction that is orthogonal relative to the first direction.

The gear box can present a volume that is similar or smaller than the volume of the electric motor.

The joint volume of the electric motor and gear set can be similar or smaller than the volume of the beverage preparation device, at least in the case of an open position.

The actuation disposition does not include, with the exception of the driving came directly connected to the mobile part of the beverage preparation device, any movement transmission element or part of movement transmission element that extends above a central reference axis of the beverage preparation device, in particular central axis aligned with the central axis of the individual portion when in the closed position.

The gear box can be provided directly connected to a driving came of the beverage preparation device, whereby said driving came is disposed so that extends along a direction orthogonal to the direction of movement of at least one mobile part of the beverage preparation device.

All the gears operatively associated with the transmission of movement can be provided inside of a gear box.

An associated objective is to provide an apparatus with an actuation disposition providing a more efficient movement transmission.

This objective is solved according to the present invention by means of an apparatus comprising an actuation disposition that includes a single movement generating device—an electric motor—, a single velocity and torque conversion device—a gear set—, and a final driving disposition for transmission of rotation movement to linear movement of a mobile part of the beverage preparation device.

The actuation disposition can be adapted so that the movement path between the initial and final positions, that is, between open and closed positions, only requires rotation movement of a driving element by a rotation angle of at most 110°, preferentially at most 95°.

The actuation disposition can be adapted so that the final transmission of rotation movement to a mobile part for the linear movement along the entire movement path, requires only one driving came directly operatively connected to a piston-like disposition, or similar.

The gear set can be directly operatively connected to a driving came that generates the forward and backward translation movement by at least one mobile part of the beverage preparation device.

The actuation cycle can include the actuation of a driving came adapted so that can move a mobile part of the beverage preparation device in a translation movement along a single direction, and thereby push and/or position an individual portion of edible substance, to an operative position, without including a compression of the edible substance.

The electric motor can be a low voltage electric motor, in particular of less than 50 V, for example between 12 V DC and 44 V DC, preferentially a motor of 24 V, or a motor of 12 V.

The electric motor can be an electric motor of direct current, DC.

The electric motor can be supplied with direct current, DC, by an AC-DC transforming device comprised in the apparatus, whereby the apparatus can be supplied with alternated current, AC, for example 110 V AC, or 230 V AC.

The electric motor can be an electric motor with a nominal electric power ($P_N$), or rated electric power, of at least 60 W, preferentially of at least 30 W, particularly preferentially at least 10 W and less than 25 W.

The electric motor can be operatively associated with a transmission box with a transmission ration comprised between 1:100 and 1:500, preferentially between 1:200 and 1:400.

A related objective is to provide an apparatus including an actuation disposition of beverage preparation device with better energy efficiency, with the contribution of a more efficient movement transmission and based upon a better monitoring of the progression of the generated movement along a translation movement path forward, from the open to the closed position, and back, in reverse manner.

In particular, this objective is solved according to the present invention by means of a beverage preparation apparatus whereby the electric motor associated with the actuation disposition of the beverage preparation device, can be regulated in each operation cycle thereof at least in terms of a limitation imposed, for example by electronic manner, upon the power supplied to, and, therefore, power effectively consumed by the electric motor, as a function of at least one of: relative position along the movement path and velocity of progression there along.

The movement path generated by the actuation disposition, of at least one mobile part of the beverage preparation device, can be linear, for example along a direction transversal to the direction of the gravity force, and include a first and a second edge of complete movement path, associated with open and closed positions of the device.

The actuation disposition can be adapted so that can regulate the supply of electric energy to the electric motor according to the relative position along the movement path, and so that the actuation between the open and closed positions, and vice-versa, does not require more than 5 seconds, preferentially does not require more than 3 seconds.

The limitation of electric power supplied to the electric motor can be imposed along at least the most part of the movement path, excluding the destination position, at least in the case of the closing movement path.

The limitation of electric power supplied to the electric motor can be imposed by control means based upon data apprehended by actuation monitoring means, along at least 90% of the movement path, at least in the case of the closing movement path.

The limitation of electric power supplied to the electric motor can be imposed according to at least one of:

a first regulation rule based upon the limitation of electric power supplied to the electric motor;

a second regulation rule including reduction and/or cut of electric power supplied to the electric motor in case of apprehension of a previously defined variation of an operative parameter of the actuation disposition.

The first and second rules can be applied according to at least one of: velocity of movement and relative position of the mobile part apprehended along the movement path.

The first rule of limitation of electric power consumed by the electric motor can be of the type limit-value and/or interval of limit-values, previously defined and at least approximately constant of the electric power supplied along at least the most part of the movement path, including the initial position and excluding the region adjacent to the destination position, at least in the case of the closing movement of the beverage preparation device.

The limit-value of electrical power supplied can be of up to 20%, preferentially of up to 10%, particularly preferentially of up to 8%, of the nominal or rated power, $P_N$, of the electric motor.

The limit-value of electrical power supplied can be of an interval of between 1 and 10%, preferentially between 2 and 9%, particularly preferentially of between 3 and 8% of the nominal or rated power, $P_N$, of the electric motor.

The limit-value of electrical power can provide a consumption of electrical energy by the electric motor of less than 10 mWh, preferentially of less than 8 mWh, particularly preferentially of less than 5 mWh, in each movement path.

The first rule of limitation of electric power supplied to the electric motor can be of the function type with only one variable, so that said limit-value is applied only as a function of the relative displacement of a mobile part of the beverage preparation device along and with reference to the previously defined movement path thereof. Said relative position can be considered along a previously defined first part of the movement path and that includes at least the region in the proximity, and excludes the region adjacent to the closed position. Said first path of movement path can advantageously include the open position and the entire extension of movement path between the open position and a region in the proximity of the closed position. The first part can correspond to at least 80% of the movement path, preferentially to at least 90%, particularly preferentially to at least 95% of the movement path the mobile part of the beverage preparation device that includes the open position and a region in the proximity of the closed position.

The second rule can be of the function type with more than one variable.

The second rule can be applied as a function of a given relative position along the movement path and as a function of the displacement direction along the movement path.

The second rule can include the cancelling or temporary interruption of electric power supply to the electric motor in the case that there is detected a previously defined variation of at least one of: velocity of displacement, rate of variation of the velocity of displacement, current intensity, rate of variation of the current intensity consumed by the electric motor.

The second rule can be applied at least in a region adjacent to the closed position, preferentially in a region corresponding to 10% of the movement path, or in at least most part of the movement path.

It is herewith advantageously provided the possibility of having an electric motor with sufficient electric power, and, therefore, torque, in the closing region, including for uniting the parts of the beverage preparation device, eventually further for pushing the individual portion inside of one part of the device, while simultaneously minimizing the risk of overheating of the electric motor.

Moreover, there is advantageously provided the possibility of detecting an eventual jam, or incorrect positioning of the individual portion in the beverage preparation device, before the closing thereof and constraining its closure, and preventing the that electric motor provides an excessive torque in the closing movement path.

The beverage preparation apparatus can include an actuation disposition that includes an electric motor operatively connected to a gear set provided so that actuates a driving came in rotation, whereby said rotating driving came can be provided in functional association with the beverage preparation device so that can generate a translation movement of at least one of the parts of the beverage preparation device, between initial and destination positions.

The beverage preparation apparatus can include control means adapted so that can control the supply of energy to the electric motor and provided in functional connection with actuation monitoring means and adapted so that can receive data therefrom.

The control means can be configured so that can limit the electric power effectively supplied to the electric motor, for example during at least the most part of the movement path, according to the relative position of displacement of a mobile part of the beverage preparation device, with reference to the movement path.

The control means can be configured so that can limit the voltage and/or current intensity supplied and, therewith, the maximum power supplied to the electric motor, preferentially to a previously defined maximum value and/or previously defined interval of values, as a function of the velocity of movement and/or the relative position of displacement of a mobile part of the beverage preparation device, with reference to the movement path.

The control means can be configured so that the power effectively consumed by the electric motor can vary along the movement path, notably according to variations of the load required along the movement path, but is limited to the maximum power that is made available to the electric motor.

The control means can be configured so that can determine the relative position of displacement of a driving came with relation to the edges of movement path, based upon the direction of rotation and the number of rotations apprehended by actuation monitoring means associated with the driving came.

The control means can be configured so that can regulate at least one of: maximum voltage and maximum electric current intensity supplied to the electric motor, in particular based upon data of parameter received from said actuation monitoring means.

In the scope of the present description, the expression "nominal power" should be understood as equivalent to the classification of rated power attributed to the device by respective fabricant, and corresponding in general to the biggest energy input that can flow through the equipment, that is the maximum power, or "stall" power of electric motor.

In particular, the nominal power of an electric motor of 24 V DC corresponds to the product of such voltage by the current intensity rated by the fabricant as the maximum admissible, eventually admitting a tolerance.

In the absence of an explicit value, provided by the fabricant of deductible from the type of operation of the electric motor, and at least in the case of 24 V DC motors, the value of the “nominal power”, $P_N$, shall be considered as equal to or less than 50 W.

DESCRIPTION OF THE FIGURES

The invention shall be hereinafter explained in greater detail based upon preferred embodiments and in the attached Figures.

The Figures show, in simplified schematic representations.

DETAILED DESCRIPTION OF PREFERRED EMBODIMENTS OF THE INVENTION

The present invention shall be described based upon embodiments of a beverage preparation system, in particular one based upon the extraction of an individual portion of edible substance, for example roasted and ground coffee beans, for example provided inside a container such as capsule, that is supplied to an extraction device so as to discharge the resulting beverage to a drinking recipient, such as for example a cup of a glass, placed on a respective placement disposition.

Figure 1:
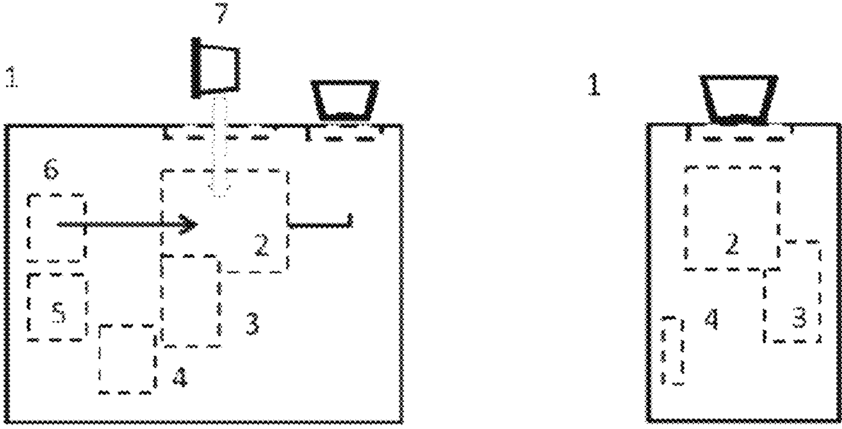
FIG. 1: side (on the left-side) and frontal view of an embodiment of beverage preparation apparatus (1) of the type of the present invention.

FIG. 1 represents side view (on the left-hand side of the drawing) and frontal view of a beverage preparation apparatus (1) according to the present invention adapted so that can collect an individual portion (7) when at an open position.

Said apparatus (1) can include a fluid reservoir (not represented), as well as a flow pressurization device (5), for example a hydraulic pump, and fluid heating means (6), so that can provide a flow supply (FS) at a temperature comprised between 60 and 100° C. and under a pressure comprised between 1 and 20 bar, preferentially between 8 and 16 bar, so as to interact with said edible substance. The expert in the field knows these means such that one herewith abdicates from a more detailed representation or description thereof.

Moreover, said apparatus (1) presents a beverage preparation device (2), hereinafter also referred to as extraction device, provided so that can collect said individual portion (7), and impinge the latter with said pressurized flow (FS) so that mixes with the edible substance and results in a beverage. Said beverage preparation device (2) can be actuated between open and closed positions, and vice-versa, by means of an actuation disposition (3) that includes an electric motor (31).

The apparatus (1) further comprises control means (4) adapted so that can control the operation of the several components of apparatus (1), including the actuation disposition (3).

Said control means (4) are adapted so that can apprehend data of a plurality of operation parameters, including: data relating to the presence of the individual portion (7) in the apparatus (1), as well as to the position of the actuation disposition (3), in particular on the edges of the movement path, thereby inferring the corresponding position of the beverage preparation device (2), in particular completely closed and open.

The electric motor (31), for example of 30 W of nominal or rated power, and 24 V DC, is directly connected to a single gear set disposed along the direction of said motor driving axis (X). Said single gear set is advantageously provided inside of a respective gear box (32), and presents a driving exit disposed along a direction orthogonal to the direction of the motor driving axis (X).

Figure 2:
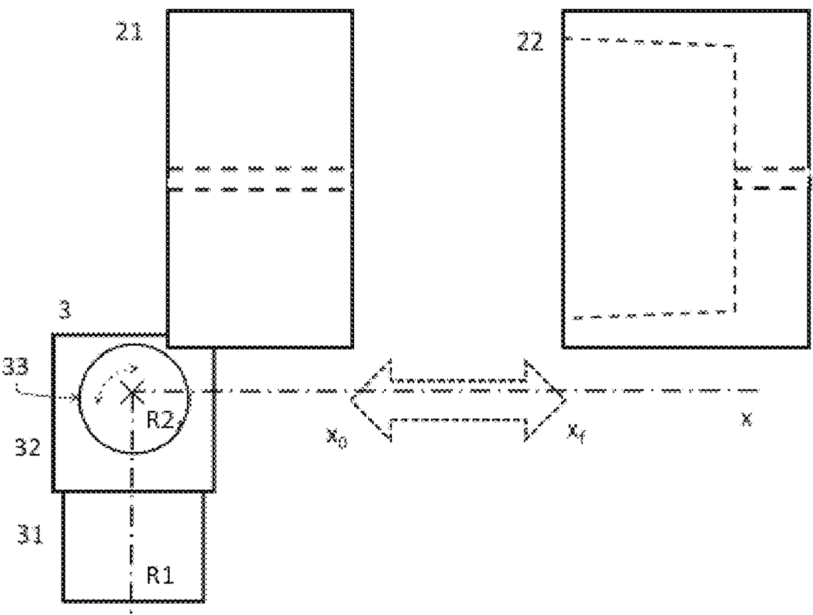
FIG. 2: actuation diagram of the beverage preparation device (2) in an apparatus (1) according to the present invention.
Figure 3:
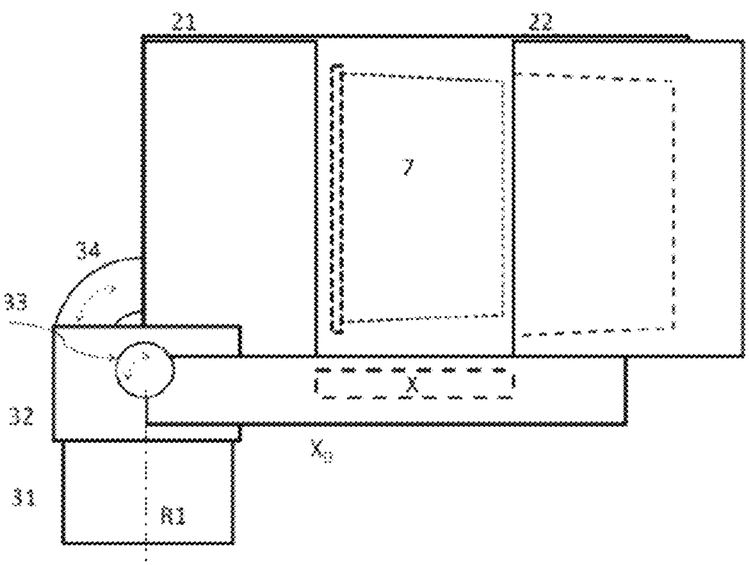
FIG. 3: actuation diagram of an opening cycle in the instant corresponding to the open position of beverage preparation device (2), in an apparatus (1) according to the present invention.
Figure 4:
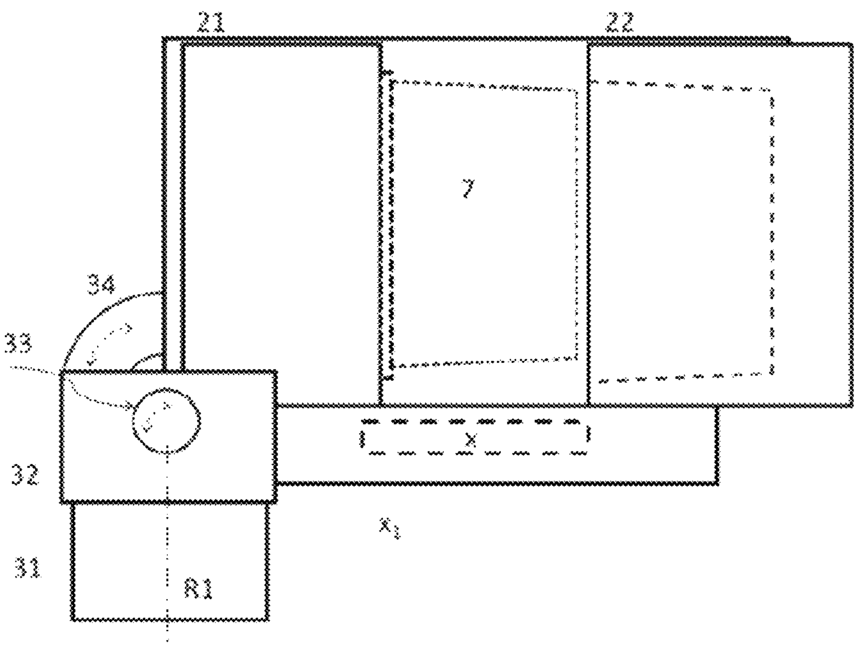
FIG. 4: actuation diagram of an opening cycle in the instant corresponding to a first displacement position of a mobile part (21) of beverage preparation device (2), in an apparatus (1) according to the present invention.
Figure 5:
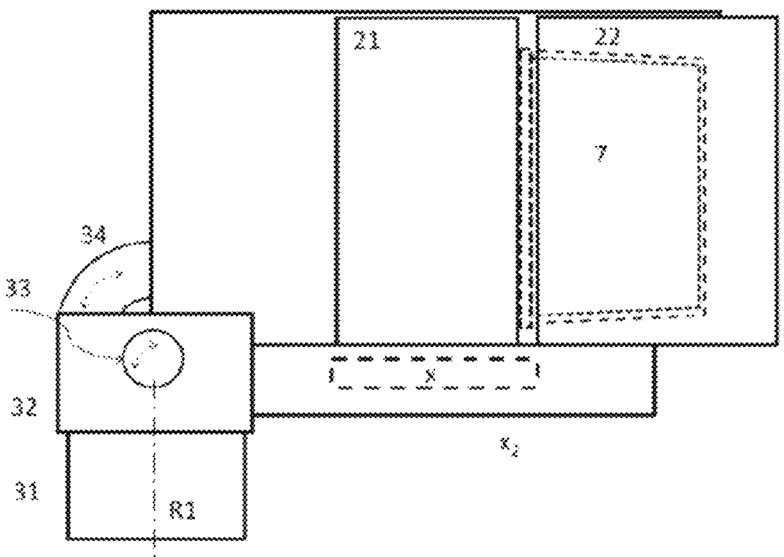
FIG. 5: actuation diagram of an opening cycle in the instant corresponding to a second displacement position of a mobile part (21) of the beverage preparation device (2), in an apparatus (1) according to the present invention.
Figure 6:
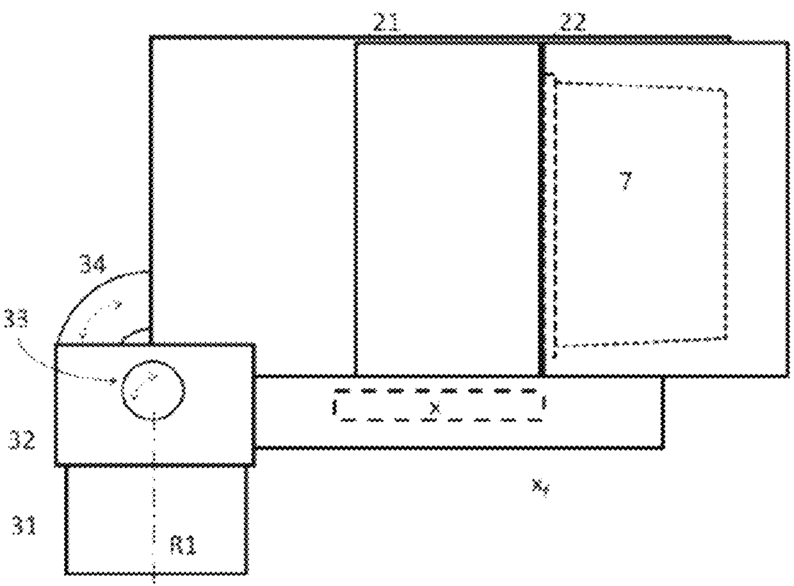
FIG. 6: actuation diagram of an opening cycle in the instant corresponding to the closed position of the beverage preparation device (2), in an apparatus (1) according to the present invention.

FIG. 2 represents the main components of a preferred embodiment of the actuation disposition (3) associated with the beverage preparation device (2) adapted for collection of an individual portion (7) of edible substance, but not for the compression of the edible substance, in a beverage preparation apparatus (1) according to the present invention.

The actuation disposition (3) comprises an electric motor (31) disposed with respective motor driving axis (X) along a direction orthogonal with relation to the actuation direction associated with the movement path of the beverage preparation device (2).

The electric motor (31), for example of 30 W of nominal or rated power, and 24 V DC, is directly connected to a single gear set (32) disposed along the direction of said motor driving axis (X). Said single gear set (32) is advantageously provided inside of a respective box, and presents a driving exit disposed along a direction orthogonal to the direction of the motor driving axis (X).

The gear set is operatively connected with a driving came (33) connected with a first edge directly to the driving exit of the gear box (32) and extending in the most of its extension transversally with relation to the beverage preparation device (2) and to the actuation direction thereof, so that the movement transmission between the gear box (32) and the beverage preparation device (2) is driven only by said driving came (33).

The actuation disposition (3) is devoid of other movement transmission elements, including devoid of isolated gears, elements of lever type, and similar.

All the main components of the actuation disposition (3) are provided encapsulated so that are not exposed to dusts or corrosive agents.

The driving came (33) can be actuated in each movement path in rotation movement in the clockwork direction and in the opposite direction, in an angular extension that corresponds approximately to a quadrant, that is, of up to at most 110°, preferentially of up to 95°.

In the case of the represented embodiment, the driving came (33) is operatively connected directly to moving means of a mobile part (21) of said beverage preparation device (2), so that said mobile part (21) can be moved between an initial position corresponding to the device (2) in the open position, and a final position corresponding to the device (2) in the closed position.

FIGS. 3 to 6 represent successive instants of a movement path of the actuation disposition (3), between open and closed position of the device (2).

The electric motor (31) generated rotation movement that is converted by the gear box (32) so that the direction is changed, from a first rotation axis (R1) to a second rotation axis (R2) orthogonal relative to the first, and so that the speed is reduced, in terms of number of rotations per minute, and torque is increased.

The driving came (33) is associated with a driving actuation disposition of the beverage preparation device (2), for example a disposition of piston type, or similar, so that the rotation movement of the driving came (33) is converted into a linear movement along a previously defined movement path corresponding to the path delimited by the open and closed positions of the device (2).

The rotation movement of the driving came (33) advantageously presents an angular extension of at most 160°, preferentially at most 120°, particularly preferentially at most 95°, corresponding to the extension of linear movement path generated by the driving came (33) on a mobile part (21, 22) of the beverage preparation device (2).

The actuation disposition (3) includes actuation monitoring means (34) operatively associated with the driving came (33) and adapted so that can apprehend at least one of: rotation direction (in the clockwork direction, or opposite hereto), angular rotation speed and number of rotations.

In particular, the actuation monitoring means (34) are provided so that apprehend a plurality of relative angular positions in a previously defined angular extension and corresponding to fractions of the linear movement path generated by the driving came (33).

As represented in greater detail in FIGS. 7 to 10, the actuation monitoring means (34) can be provided in the form of optic means of apprehension of variation of position, for example of "encoder" type.

Figure 7:
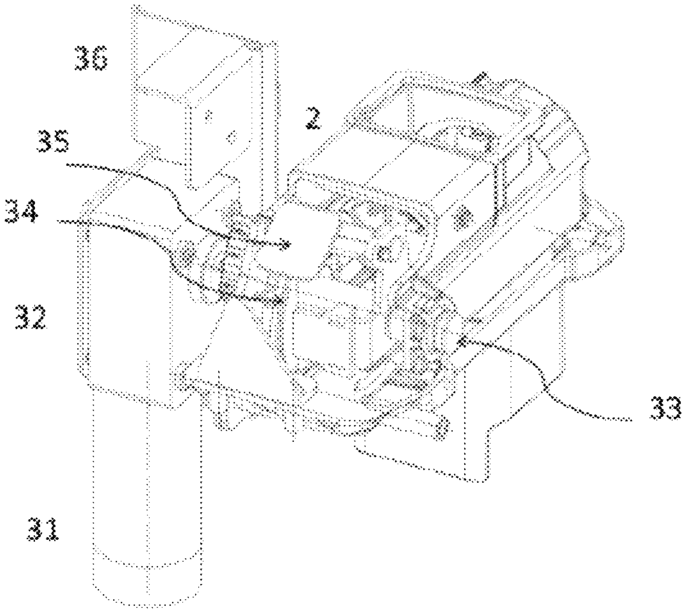
FIG. 7: perspective view from above of a preferred embodiment of a beverage preparation device (2) and respective actuation device (3) according to the present invention.
Figure 8:
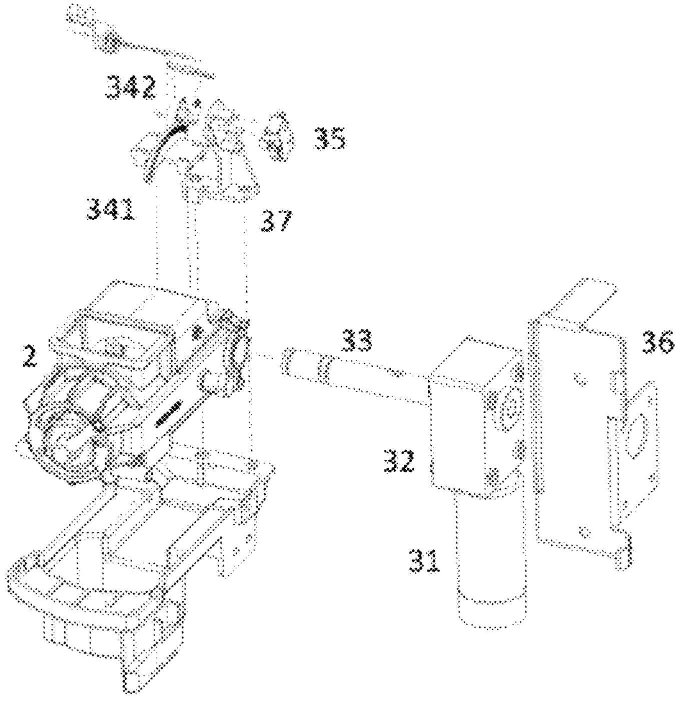
FIG. 8: exploded perspective view from above of the preferred embodiment represented in FIG. 7.
Figure 11:
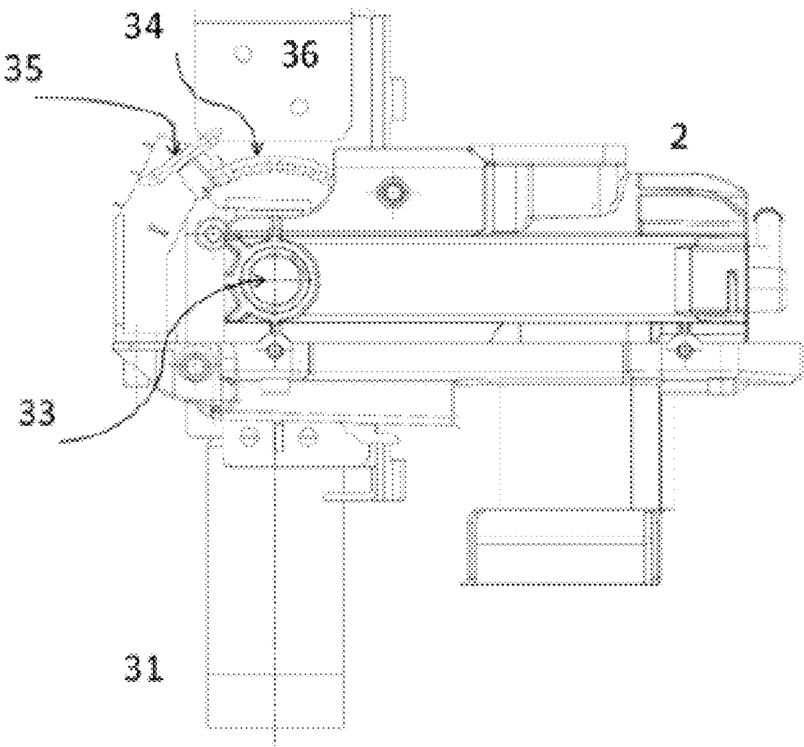
FIG. 11: first side view of the embodiment represented in FIG. 7.
Figure 12:
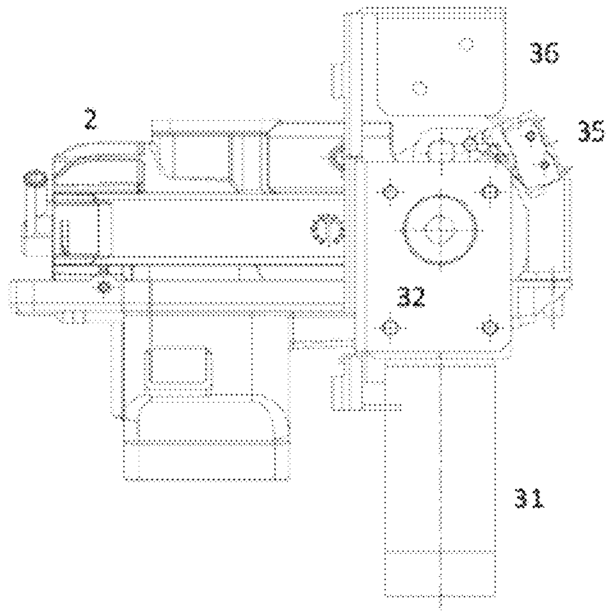
FIG. 12: second side view of the embodiment represented in FIG. 7.

FIGS. 7 and 8, as well as FIGS. 11 and 12, represent a preferred embodiment of the beverage preparation device (2) and actuation disposition (3) thereof.

The electric motor (31) and gear box (32) are disposed along a first alignment orthogonal with relation to the movement path realized by one mobile part (21, 22) of the beverage preparation device (2).

The electric motor (31) is operatively connected to the gear box (32) as the latter is fixed to a first support (36).

The reference volume occupied by these components of the actuation disposition (3) can be similar, preferentially smaller than the constructive volume of the beverage preparation device (2). Moreover, it is advantageous when no element of movement transmission of the actuation disposition (3) elevates above the beverage preparation device (2).

The transversal extension, with relation to the direction of the movement path, of the set formed by the electric motor (31) and gear set (32) is smaller than the transversal extension of the beverage preparation device (3).

At least part of the transversal extension, with relation to the direction of the movement path, of the set formed by the electric motor (31) and gear box (32) can be aligned in projection with at least part of the transversal extension of the beverage preparation device (2).

It is herewith advantageously provided a construction that is simple, compact and effective in terms of movement transmission of the actuation disposition (3) and beverage preparation device (2), reducing the volume required by the set inside a beverage preparation device (1).

Figure 9:
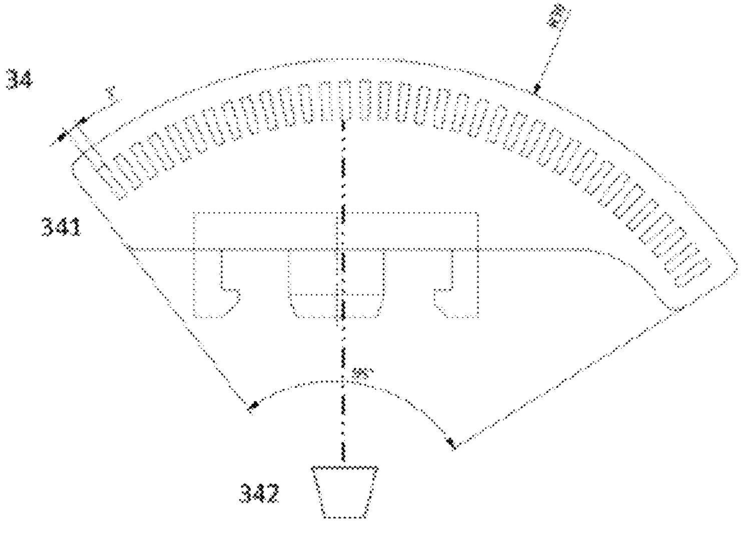
FIG. 9: side view of a preferred embodiment of mobile (341) and stationary parts (342) of actuation monitoring means (34) in an actuation disposition (3) of an apparatus (1) according to the invention.
Figure 10:
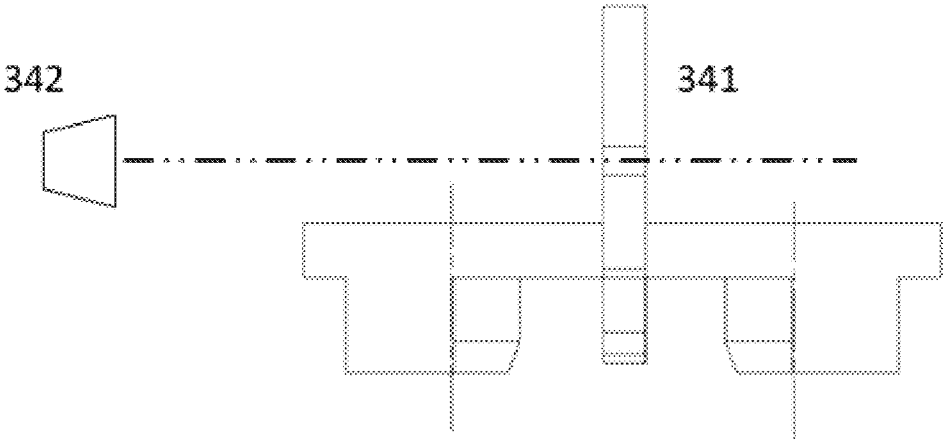
FIG. 10: frontal view of a preferred embodiment of mobile (341) and stationary parts (342) of actuation monitoring means (34) in an actuation disposition (3) of an apparatus (1) according to the invention.

FIGS. 9 and 10 represent the two parts (341, 342) of the actuation monitoring means (34) of optical type that are provided in functional connection with control means (4) of the apparatus (1) according to the invention.

Said actuation monitoring means (34) can include a first mobile part (341) including a plurality of observation references, for example in the form of openings or windows, and a second stationary part (342) that includes a sender of electromagnetic radiation, for example an infrared beam. The first and second parts (341, 342) are preferentially provided in a common structural support (37), and disposition in a spatial relation relative to each other so that the infrared beam can successively intersect the openings.

The first mobile part (341) is jointly associated in movement with the driving came (33), so that can be jointly rotated therewith. Moreover, the first mobile part (341) presents a plurality of openings of similar dimension at constant distances in-between, so that provide windows of observation, enlightened by the second stationary part (342), and corresponding to fractions of angular extension of movement, so that relative positions of the linear movement path can be apprehended.

FIGS. 11 and 12 represent opposite side views of the presented embodiment.

Figure 13:
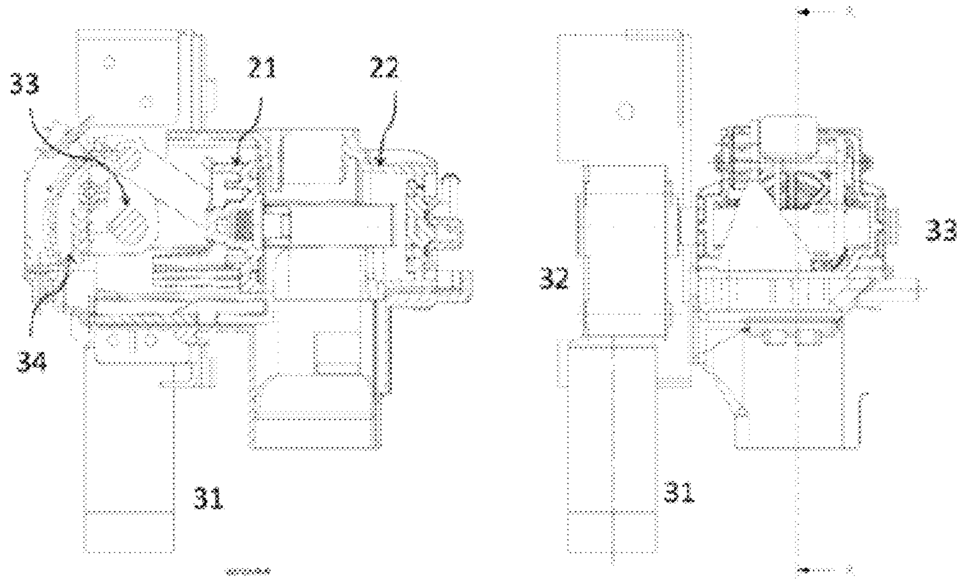
FIG. 13: side-cut view (on the left-side) of preferred embodiment of the actuation disposition (3) with beverage preparation device (2) in the open position, on an apparatus (1) according to the present invention.
Figure 14:
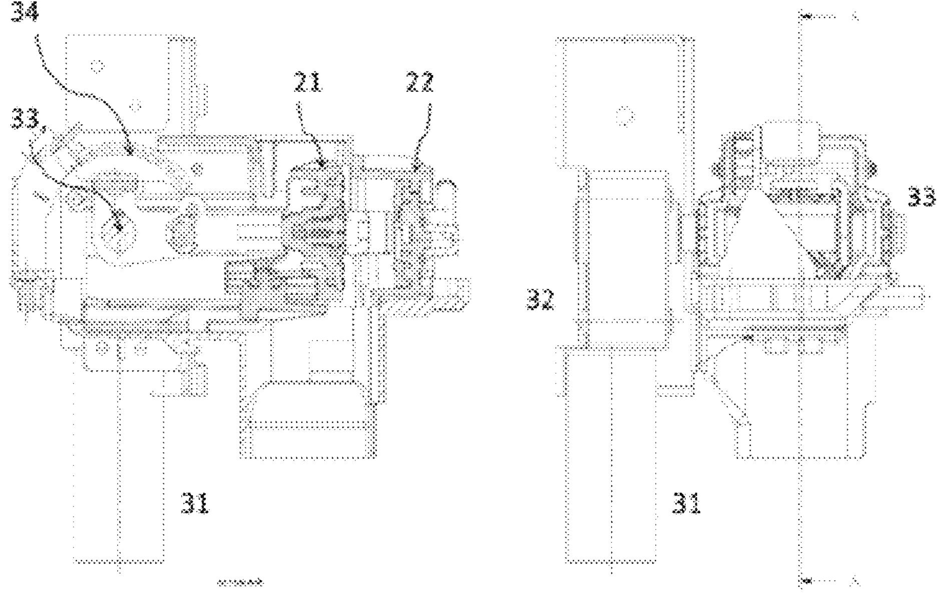
FIG. 14: side-cut view (on the left-side) of preferred embodiment of the actuation disposition (3) with beverage preparation device (2) in the closed position, on an apparatus (1) according to the present invention.

FIGS. 13 and 14 represent side and posterior views, with relation to the beverage discharge, with the actuation disposition (3) in open and closed positions, respectively.

As can be observed in the represented embodiment, the driving came (33) is functionally connected in edge regions thereof to respective arms of a piston-like disposition, so that the rotation movement of the driving came (33) is converted into the linear movement of a mobile part (21) along the movement path between the open and closed positions.

FIGS. 15 to 18 schematically represent, on an indicative basis, curves of evolution of electric power supplied to the electric motor (31) along the movement path of the actuation disposition (3), according to a first and a second rule of regulation thereof.

Figure 15:
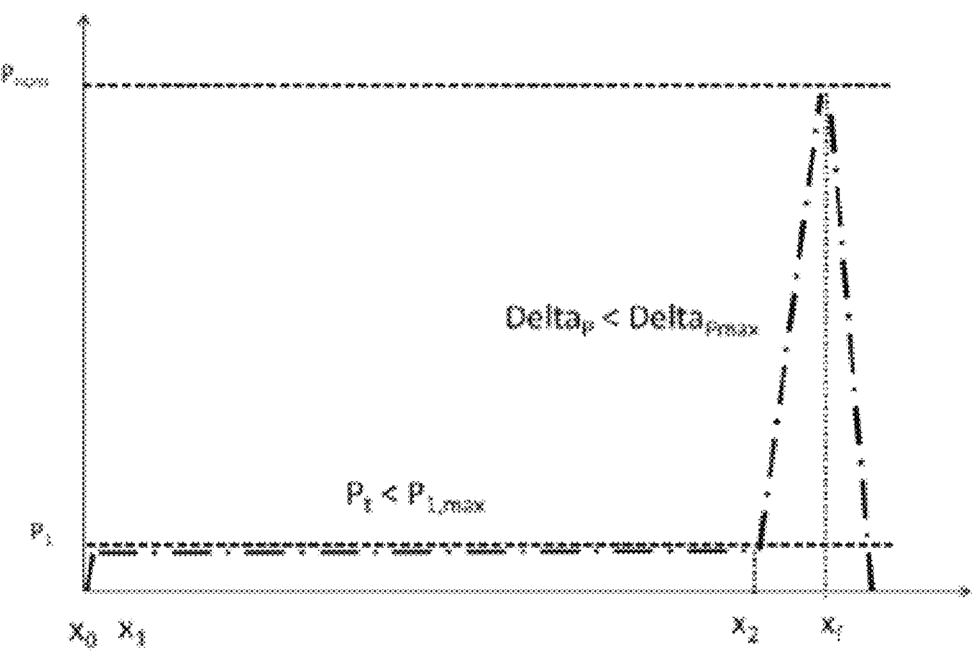
FIG. 15: schematic graphic of application of preferred embodiment of a first rule of limitation of electric power supplied to the electric motor (31) in a closing movement, according to the present invention.
Figure 16:
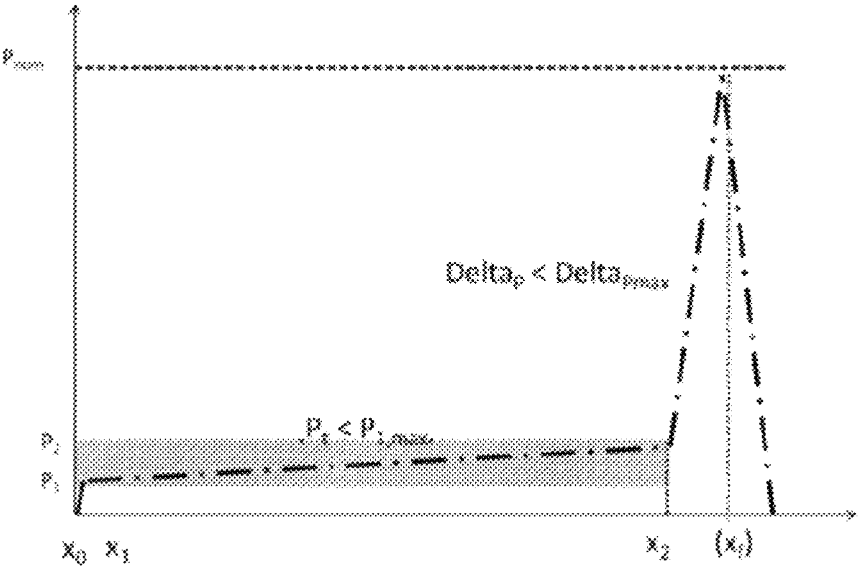
FIG. 16: schematic graphic of application of preferred embodiment of a first rule of limitation of electric power supplied to the electric motor (31) in a closing movement, according to the present invention.

As reproduced in FIGS. 15 and 16, according to a first rule, the control means (4) and the actuation disposition (3) can be adapted so that limit the supply of electric power to the electric motor (31) to a previously defined maximum limit-value ($P_1$) (see FIG. 15), along of at least the most part of the movement path, including at least a region in the proximity of the closed position, but excluding the region directly adjacent thereto. Said limitation of the electric power supplied to the electric motor (31) can be regulated by control means (4) by means of limitation of the voltage made available in the power supply circuit of the electric motor (31).

It is herewith ensured that, despite of an eventually relatively bigger maximum or nominal power ($P_{nom}$) of the electric motor (31), and eventually necessary so as to be able to generate a sufficient torque for the part of movement path corresponding to the encounter of the parts (21, 22) of the beverage preparation device (3), despite thereof, the electric motor (31) consumes a minimum of energy required during the most part of the extension of the movement path. Naturally, the value of the power that is effectively consumed by the electric motor (31) could have small oscillations, but shall always be kept below said maximum limit-value ($P_1$).

In an alternative embodiment, the control means (4) and actuation disposition (3) can be adapted so that the supply of electric power to the electric motor (31) can vary within an interval of previously defined values of power ($P_1$, $P_2$) along at least the most part of the movement path (see FIG. 16).

Figure 17:
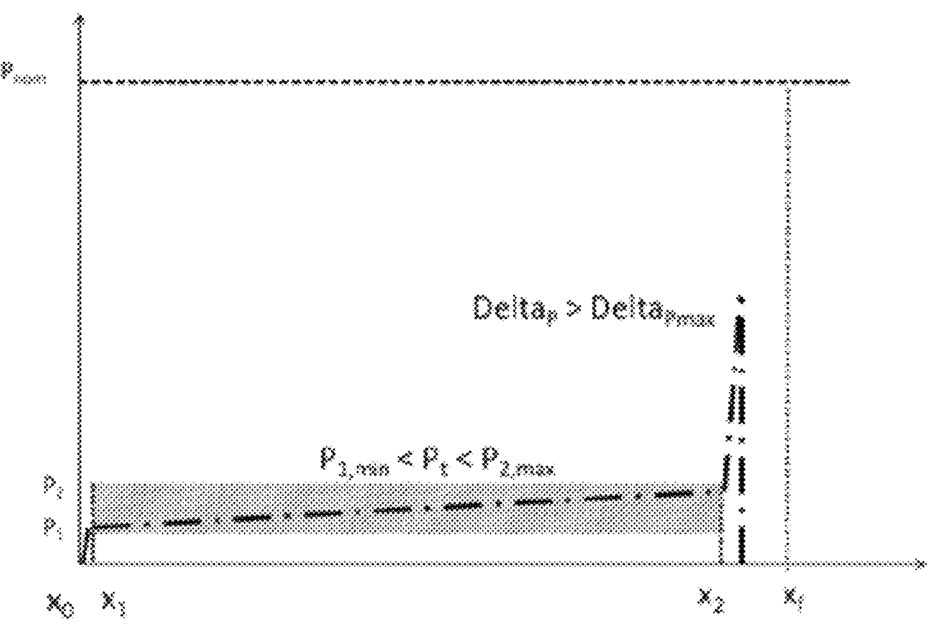
FIG. 17: schematic graphic of preferred embodiment of a second rule of limitation of electric power supplied to the electric motor (31) in a closing movement, according to the present invention.
Figure 18:
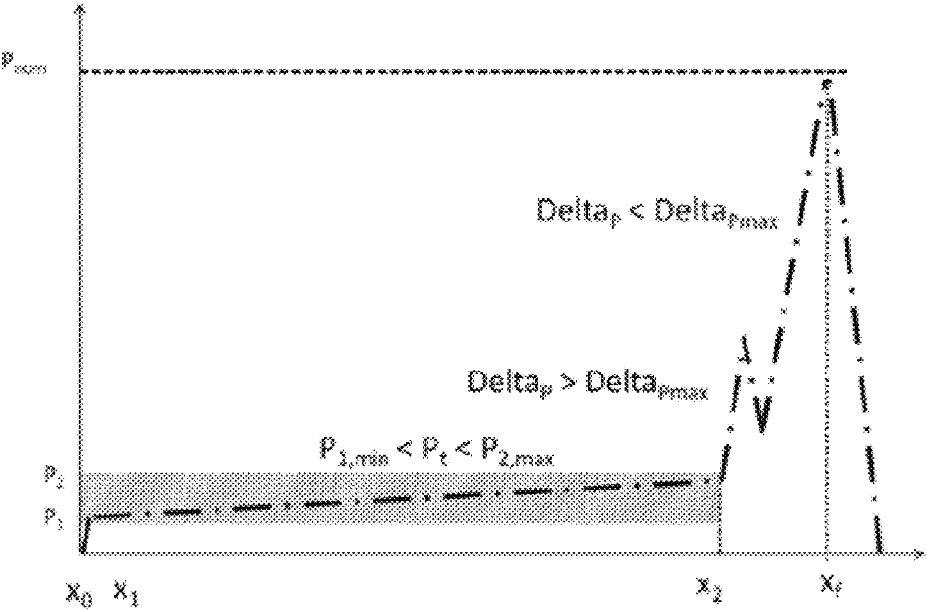
FIG. 18: schematic graphic of preferred embodiment of a second rule of limitation of electric power supplied to the electric motor (31) in a closing movement, according to the present invention.

As represented in FIGS. 17 and 18, the control means (4) and actuation disposition (3) can be adapted so that, according to a second rule, the electric power supplied to the electric motor (31) can be reduced or interrupted, in case that there is detected a previously defined variation ($Delta_P$), in particular a variation of increase or a rate of increase of the electric power effectively consumed by the electric motor (31), at least in the region adjacent to the closed position of the beverage preparation device (2).

In case of detection of a variation of electric power ($Delta_P$) higher than a previously defined maximum value of variation of electric power ($Delta_{Pmax}$), the control means (4) can command a total interruption, as represented in FIG. 17, or a temporary reduction, as represented in the FIG. 18, of the electric power supplied to the electric motor (31).

It is herewith advantageously provided the possibility of detecting an excessive requirement of torque, for example resulting from a jamming of individual portion (7) between parts (21, 22) of beverage preparation device (2), and preventing that such an excessive increase of torque might damage some part thereof or of the actuation disposition (3).

The combination of said first and second regulation rules advantageously provides the possibility of using an electric motor (31) with a nominal power ($P_{nom}$) that is sufficient for providing the amount of torque required, in particular in the region adjacent to the closed position, both in the closing movement path as in the opening movement path, while simultaneously ensuring that the latter operates with an energy consumption profile that is adjusted to the needs of each part of the movement path, and preventing risks associated with eventual anomalous situations.

The first and second regulation rules of energy supply to the electric motor (31) are preferentially defined in control means (4) and applied by the latter, based upon data apprehended by the actuation monitoring means (34, 35).

The invention claimed is:

1. An apparatus comprising a beverage preparation device comprising a mobile part adapted to be driven by an actuation disposition in a movement path between an open position, where the beverage preparation device can collect an individual portion of edible substance, and a closed position, and in a reverse movement path;

wherein the actuation disposition includes a movement generating device comprising an electric motor, a velocity and binary conversion device comprising a gear set operatively connected to the electric motor and disposed above the electric motor, and a driving transmission for transmitting rotational movement to linear movement of the mobile part of the beverage preparation device;

wherein an output of the electric motor rotates about a first axis that is vertically oriented and an output of the gear set rotates about a second axis that is orthogonal to the first axis;

wherein the electric motor is disposed below the gear set;

wherein the electric motor is operatively connected by direct movement transmission to the gear set, whereby the gear set is adapted for direct transmission of rotational movement of a driving member that drives the mobile part of the beverage preparation device; and wherein the actuation disposition includes a monitoring part that is moveable together with a driving member and that presents a plurality of openings arranged along an angular alignment, as well as a fixed part configured to emit a beam of electromagnetic radiation, said beam oriented to intersect said angular alignment of openings of the monitoring part.

2. The apparatus according to claim 1, wherein all components of the movement transmission of the actuation disposition are provided encapsulated so as not to be exposed to dusts or corrosive agents.

3. The apparatus according to claim 1, wherein the driving member is adapted to provide direct movement transmission between a transmission exit of the gear set and an actuation part of the beverage preparation device, whereby the driving member extends along a whole width of the actuation disposition and along at least most part of a transversal extension of the beverage preparation device.

4. The apparatus according to claim 1, wherein the electric motor and the gear set jointly occupy a reference volume with a height that is bigger than a reference width thereof, with reference to a direction of gravitational force, inside of the apparatus, whereby said reference volume occupied by the electric motor and the gear set is disposed laterally and in an edge region with relation to the beverage preparation device.

5. The apparatus according to claim 1, wherein the electric motor is disposed completely below or completely above, with reference to a direction of gravitational force, a level of at least one of: a central axis of the driving member and a central axis of the beverage preparation device.

6. The apparatus according to claim 1, wherein the electric motor is disposed in proximity of the beverage preparation device so that the driving axis associated with the electric motor extends in a direction orthogonal to the direction of a movement path of the mobile part of the beverage preparation device, whereby the driving axis associated with the electric motor extends along one of:

a vertical direction with reference to a direction of gravitational force in a case that the driving direction of the mobile part extends along a direction transversal to the direction of the gravity force;

a horizontal direction with reference to the direction of the gravitational force in a case that a driving direction of the mobile part extends along a direction parallel to the direction of the gravity force.

7. The apparatus according to claim 1, wherein the gear set presents one movement entry oriented along a first direction and directly operatively connected with a movement exit from the electric motor, and presents one movement exit oriented along a second direction that is orthogonal relative to the first direction, whereby the gear set presents a volume that is similar or smaller than a volume of the electric motor, and whereby a joint volume of the electric motor and a gear box is similar or smaller than a volume of the beverage preparation device, at least in a case that the beverage preparation device is in the open position.

8. The apparatus according to claim 2, wherein the actuation disposition is adapted so that the linear movement path between the open position and the closed position of the beverage preparation device, and vice-versa, requires only a rotation movement of the driving member by a rotation angle of at most 110° in a clockwork direction and reverse.

9. The apparatus according to claim 2, wherein the actuation disposition is adapted to monitor at least one movement parameter associated with a circular movement of the driving member in an interval of quadrant with an angular extension of less than 110°, so that, in each movement path of the beverage preparation device, the apparatus can determine at least one of the following parameters: direction of rotation, number of rotations and speed of rotation of the driving member.

10. The apparatus according to claim 2, wherein the actuation disposition is associated with the driving member, so that the apparatus can determine at least one of the following movement parameters: direction of rotation, number of rotations between edges of the movement path, velocity of rotation of the driving member.

11. The apparatus according to claim 2, wherein the actuation disposition is adapted to determine, by an optical way, or by an electromagnetic way, a relative position of the driving member with relation to previously defined references of operation thereof using an optical monitoring device that optically monitors successive positions in a mobile support.

12. The apparatus according to claim 1, wherein the actuation disposition is configured to detect at least one end of movement path, including the end of movement path corresponding to the open position of the beverage preparation device.

13. The apparatus according to claim 1, wherein the actuation disposition includes a first fixation support disposed laterally with relation to the movement path associated with the actuation disposition, whereby only a gear box is fixed to said first fixation support, and whereby the beverage preparation device is supported by a structural support different from the first fixation support.

14. The apparatus according to claim 1, wherein the actuation disposition includes a fixation support.

15. The apparatus according to claim 9, wherein the interval of quadrant has an angular extension of between 90° and 100°.

16. The apparatus according to claim 8, wherein a required rotational movement of the driving member is a rotation angle of at most 95°.

17. The apparatus according to claim 1, wherein the gear set is contained within a gear box and the electric motor and the gear box extend in an alignment parallel to direction of the gravitational force.

18. A beverage preparation apparatus, comprising:

a mobile part adapted to be driven by an actuation disposition in a movement path between an open position, where the beverage preparation device is configured to collect an individual portion of edible substance, and a closed position, and in a reverse movement path;

wherein the actuation disposition comprises a movement generating device comprising an electric motor, a gear set operatively connected to the electric motor and disposed above the electric motor, and a driving transmission for transmitting rotational movement to linear movement of the mobile part of the beverage preparation device;

wherein the electric motor is disposed below the gear set;

wherein the electric motor is operatively connected by direct movement transmission to the gear set, whereby the gear set is adapted for direct transmission of rotational movement of a driving member that drives the mobile part of the beverage preparation device; and wherein the actuation disposition includes a monitoring part that is moveable together with a driving member and comprises a plurality of openings arranged along an angular alignment, as well as a fixed part configured to emit a beam of electromagnetic radiation, said beam oriented to intersect said angular alignment of openings of the monitoring part.

19. The apparatus according to claim 18, wherein an output of the electric motor rotates about a first axis that is vertically oriented and an output of the gear set rotates about a second axis that is orthogonal to the first axis.

20. The apparatus according to claim 18, wherein the electric motor is disposed below or above, with reference to a direction of gravitational force, a level of at least one of: a central axis of the driving member and a central axis of the beverage preparation device.

* * * * *